United States Patent Office 3,219,105
Patented Nov. 23, 1965

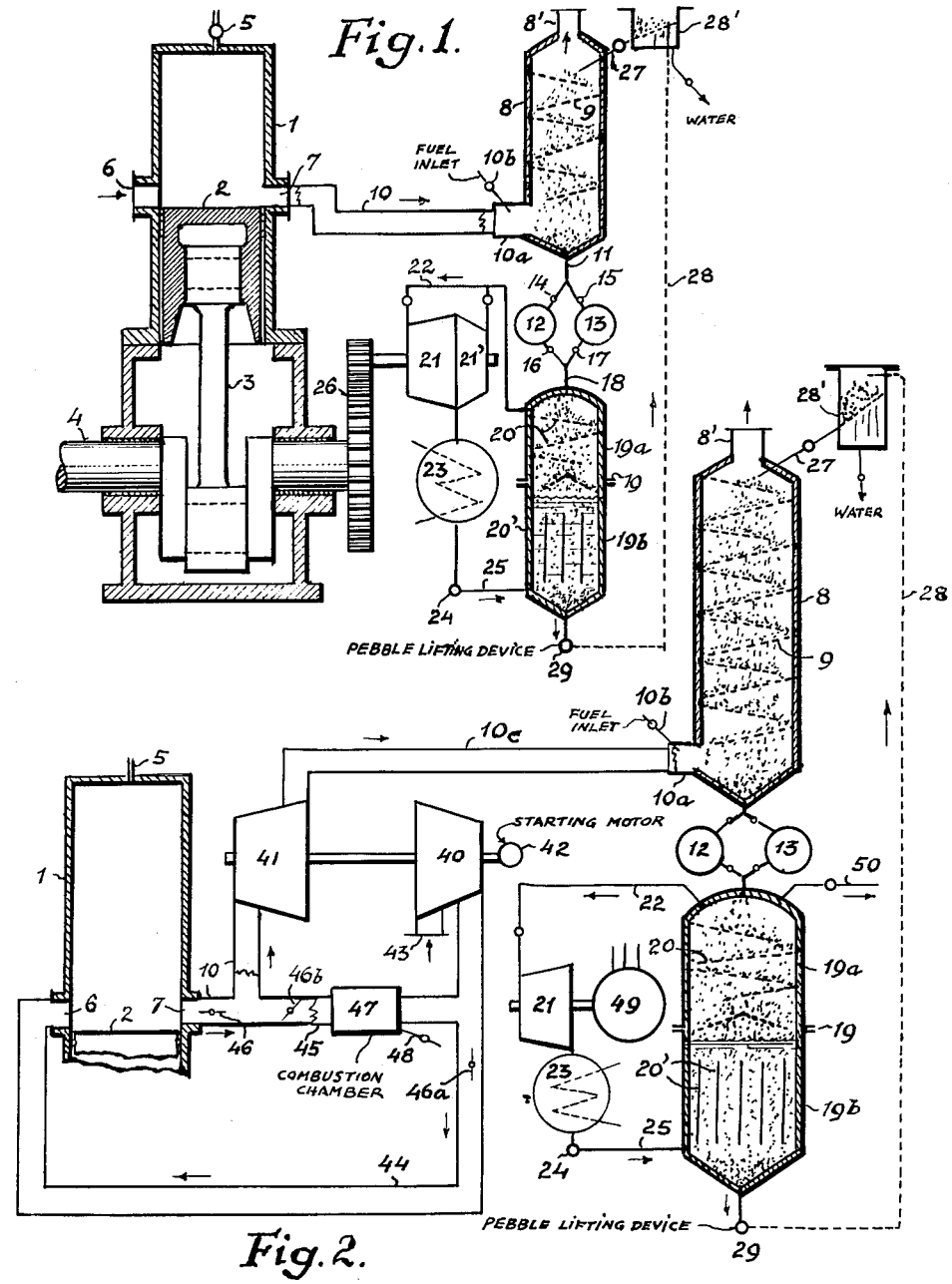

3,219,105
METHOD AND APPARATUS FOR PRODUCING SUPERHEATED STEAM, IN PARTICULAR FOR POWER RECOVERY FROM THE EXHAUST OF INTERNAL COMBUSTION ENGINES
Frederick Nettel, 173 Chapel Road, Manhasset, N.Y.
Filed Oct. 24, 1962, Ser. No. 232,690
2 Claims. (Cl. 165—106)

Many systems heretofore have been proposed for utilizing the heat contained in waste gases. The present invention deals with this problem, in particular the use of the exhaust gases of internal combustion engines for power recovery.

Most of the previously known systems for waste gas utilization involve hot water production, some involve steam production by means of convection-type waste heat boilers (donkey boilers).

It is also known to use steam produced by the exhaust heat from internal combustion engines for driving engine turbocharger sets and for driving steam turbines coupled to electric generators to add to the output of the internal combustion engines. It is further known to provide a conventional waste heat boiler with an auxiliary fuel burner to enhance the output of such boiler temporarily, and it has also been envisaged to operate a system by means of such an auxiliary burner while the internal combustion engine is idle, and to start said engine by means of a turbine fed with steam from the waste heat boiler.

None of the known proposals for power recovery from waste gases, some made decades ago, has proved commercially successful and none is in use now, in spite of the fact that an economic solution of this problem is of major importance, particularly for the exhaust from internal combustion engines.

I have discovered that the reason for the failure of the known systems is simple: None of the waste heat boilers has been designed, or can be economically designed, to give a substantial degree of superheat to the steam. The cause for this is that the temperature of the available waste gases in many practical cases is not much higher than a desirable superheat temperature for use of the steam in a steam turbine, and it would require economically unbearable convective heat transfer surfaces to bring the steam temperature sufficiently close to the waste gas temperature which, as mentioned above, is in the same order of magnitude as the desired superheat temperature (abt. 550 to 750° F.).

Saturated steam is, as a glance at the Mollier diagram for steam teaches, not suitable for use in steam turbines because (a) its enthalpy is too low and (b) because during expansion it leads to excessive moisture content of the steam which not only lowers the turbine efficiency substantially, but also causes unbearable erosion of the turbine blades.

In addition, tubular waste heat boilers are subject to severe corrosion and plugging due to contaminants in the engine exhaust (vanadium, sulphur, sodium etc.) which increase maintenance costs to such extent as to make heat recovery troublesome, if not uneconomical.

It is also known to use so-called pebble heaters to transfer heat from a gas stream to a stream of granular material (metal, ceramics, carbides for examples) and from the heated pebbles to either air, gas or vapors by direct contact heat transfer, and to let warm pebbles fall into water in a closed chamber, thereby heating and evaporating the water. In the known arrangements, however, this results again in substantially saturated steam because they fail to realize and teach the essential steps of this invention disclosed further below.

It is the principal object of this invention to eliminate these disadvantages. Other and further objects and advantages of my present invention will become apparent from the following description and the accompanying drawings, which show in diagrammatic form, embodiments of the invention by way of non-limiting examples.

FIG. 1 shows a plant for producing superheated steam from the exhaust of an internal combustion engine with power recovery in a steam turbine coupled with the engine.

FIG. 2 shows a modification of my invention applied to a turbo-charged internal combustion engine with the power recovery steam turbine driving an electric generator.

The principal object of my instant invention is achieved by producing superheated steam using a stream of comminuted material, generally referred to as pebbles, which passes downwards by gravity in a first chamber in counterflow contact with upwardly rising hot waste gases at near-atmospheric pressure thereby heating the pebbles and cooling the gases which are discharged adjacent the top of the first chamber to the atmosphere. The heated pebbles then are lead into a second chamber, containing steam at elevated pressure, via sluicing means to overcome the pressure difference between the two said chambers, thereafter falling by gravity into a third chamber containing water part of which is evaporated into saturated steam by contact with the hot pebbles. This steam flows upward into the second chamber in which baffles or equivalent means are provided in the path of the hot descending pebbles for delaying their downward motion and providing a protracted uniform counterflow contact between the steam rising from the third chamber and the hot pebbles for a predetermined length of time sufficient to superheat the steam by not less than ¾ of the difference in temperature between the pebbles at the entrance to said second chamber and the saturation temperature of the steam generated in the third chamber. The superheated steam is then discharged from said second chamber to a utilization device.

Another object of my invention is achieved by providing means in the said third chamber to ensure uniform counterflow contact between the descending pebbles and the ascending water while the water is being heated and evaporated.

A further object of my invention is realized by separating the pebbles from the water after the pebbles have been cooled by successive contact with steam and water respectively, and using the cold pebbles again for absorbing heat from the hot gases, so that the pebbles flow in a substantially closed circuit.

Still other advantages gained from my invention will be apparent as this specification proceeds.

Turning now in more detail to FIG. 1 of the drawings, 1 is a diesel engine with a piston 2, a connecting rod 3, a crankshaft 4, a fuel injection nozzle 5, intake ports 6, and exhaust ports 7. 8 is a vertically elongated upright pebble heater chamber containing transverse baffles 9. A pipe 10 connects the exhaust ports 7 with an opening adjacent to the bottom of the chamber 8. The chamber 8 has at its top a stack opening 8' and at its bottom an exit opening 11 for heated pebbles. Connected to the opening 11 are two parallel vessels 12 and 13, with pebble valves 14 and 15 at their inlets and valves 16 and 17 at their outlets. The outlets are further connected to a pipe 18 leading into a vertically elongated upright steam generator chamber 19 designed to withstand the required steam pressure. This chamber consists of two parts: an upper second chamber 19a in which transverse superheater baffles 20, similar to the baffles 9 in the chamber 8, are provided and a lower (third) chamber 19b filled with water to a predetermined height. 21 is a steam turbine having its inlet connected to the top of the second chamber 19a by the steam pipe 22. 23 is a condenser connected to the turbine exhaust with a condensate pump 24 which feeds condensate back into a point adjacent the bottom of the third chamber 19b through the pipe 25. The turbine 21 is shown coupled to the crankshaft 4 through a reduction gear set 26; however, any other kind of power transmission may be used, hydraulic or electric for example, or the turbine 21 may drive any other power consumer not necessarily connected with the engine 1.

Cold pebbles e.g. small particles of metal or ceramics, carbides etc. enter the heating chamber 8 through a pipe 27, fall in multiple cascades over the labyrinth transverse baffles 9, leaving via the opening 11 to flow into one or the other sluice vessels 12 and 13. The valves 14 to 17 are operated in such sequence that while one sluice vessel is filling from the chamber 8, the other sluice vessel discharges via the pipe 18 into the top of the chamber 19, and more specifically into its upper part 19a. On entering the second chamber 19a the heated pebbles fall over the superheater baffles 20, which are characteristic for this invention because of their effect of delaying the passage of the hot pebbles through the steam rising in counterflow and thereby providing sufficient time for heat transfer to substantially superheat the steam by not less than ¾ of the difference in temperature between the pebbles at their entrance to the second chamber 19a and the saturation temperature of the steam evaporated in the third chamber 19b. After passing through the baffles 20 as shown, the pebbles fall into the water in the third chamber 19b where their remaining heat is used for heating and evaporating the water at the elevated pressure prevailing.

The pebbles collect at the bottom of the third chamber 19b. Next the pebbles enter a pebble duct 28 having an interposed pebble lifting device 29 of any kind which serves to lift the pebbles into the pipe 27 through which they are returned into the pebble heating chamber 8, completing a substantially closed pebble flow circuit. Hydraulic, pneumatic or mechanical pebble lifting apparatus are known and do not form per se part of this invention. Since the pebbles form a slurry with the water in the third chamber 19b, a tank 28' is provided in which the water is drained off before the pebbles reach the first chamber 8.

The engine 1 is started in a conventional manner by means of compressed air from bottles or by another available starting motor (not shown). Exhaust gases begin to flow through the pipe 10 into the first chamber 8, leaving through the stack 8'. With the pebble lifting device 29 energized, pebbles enter the top of the first chamber 8 where they are heated by the exhaust gases flowing upwards in counterflow to the descending pebbles, while these gases are cooled themselves. Heated pebbles reach the second chamber 19a via the sluice vessels 12 and 13 as mentioned above, and fall while being delayed by the baffles 20, into the water in the third chamber 19b. There the still warm pebbles begin to heat the water and eventually to evaporate it, generating first saturated and then, in 19a, superheated steam of a predetermined pressure and temperature.

As can be seen from the drawing, the pipe 22 between the top of the second chamber 19a and the turbine 21 is connected to said chamber 19b at a point above the baffles 20. Thus the steam produced in the chamber 19a must flow upwards through these baffles in the chamber 19b before flowing superheated into the turbine 21. The pebbles entering the superheating chamber 19b are at their highest temperature, for example 600° F. or more, and thus can superheat the steam, emerging saturated from the water in the third chamber 19b and flowing upwards in counterflow to the pebbles, to nearly the same high temperature, due to the huge heating surface offered by the pebbles, provided practically all pebbles are made to maintain heat exchange contact with steam for a sufficient length of time as is done by the delaying baffles 20.

This method and means for superheating the steam is a characteristic feature of this invention. The sluice vessels prevent the escape of substantial quantities of steam back into the first chamber 8. Very soon sufficient steam will be available to drive the steam turbine 21 which assists the engine 1 or supplies power for any other purpose.

If desired, power production by the steam turbine can be increased by burning additional fuel in a combustion chamber 10a, with a fuel inlet pipe 10b, interposed in the pipe 10. This is possible because the engine exhaust gases contain free oxygen. By using this free oxygen for combustion, the temperature of the gases entering the first chamber 8 can be sharply increased and the pebbles in turn will reach the second and third chambers 19a and 19b hotter, resulting in faster and increased steam generation for the turbine 21. The combustion chamber 10a can thus be used to produce considerable extra power in the turbine 21, for which internal combustion engines by themselves are not very well suited. The combustion chamber 10a is intended only for temporary use because it actually reduces the overall efficiency of the power plant. Within the third chamber 19b upright partition walls 20' may be arranged below the water surface to provide a plurality of parallel channels through which the water must rise while being heated by the pebbles falling through these channels. These partitions ensure a uniform counterflow heat exchange between pebbles and water which contributes substantially to improve the efficiency of steam production. This gain becomes of particular importance in case of higher steam pressure and, therefore, saturation temperature.

The arrangement as per FIG. 1 furnishes radical savings in fuel consumption in lbs./SHP. hr. over pure diesel plants, because the heat in the exhaust gases, which may amount to about 30% of the fuel heat supplied to the engine, is utilized by my present invention in the most efficient manner down to the temperature of the steam turbine condensate i.e. about 90° F. on an average. This thermal effect is shown also by the radical reduction of the stack gas temperature, which may be as low as 200° F. if desired. Calculations show, that the overall plant efficiency is increased by 20 percent or more as compared with a diesel engine without power recovery.

By way of example I have set forth below typical operating values: A pressure of, say, 100 p.s.i. exists in the chamber 19. This pressure is maintained by regulating the steam discharge quantity to match the steam produced. Conforming to the pressure of 100 p.s.i., the boiling water in the third chamber 19b, and the steam emanating from it, will have a temperature of 328° F. (saturation temperature).

The pebbles, heated by the exhaust gases, enter the superheating second chamber 19a through the pipe 18 at a temperature of about 600° F., that is substantially hotter than the saturated steam. However, these pebbles flow down through the superheating second chamber 19a, equipped with delaying baffles 20, in counterflow to a stream of steam rising from the water surface in the third chamber 19b on its way out through the discharge pipe 22. During this internal and predetermined counterflow action heat is exchanged between pebbles and steam; the later is heated to close to 600° F. (at least to a superheat of ¾ of the difference between 328° F. and 600° F.) and thereby cools the pebbles by 50 to 60° F. The remaining heat contents of the pebbles is used for heating and evaporating the water in the steaming (third) chamber.

FIG. 2 illustrates an embodiment of my invention specially suited for utilizing the exhaust from turbocharged internal combustion engines. Parts equivalent to those shown in FIGURE 1 are denoted by the same numerals. In this case, a turbocharger set consisting of an air blower 40 and an exhaust turbine 41 are mounted on a common shaft together with a starting motor 42. The exhaust turbine 41 is connected to the exhaust ports 7 via the pipe 10 with a flap valve 46 and exhausts into the heating chamber 8 through a pipe 10c. The air blower 40 takes in air at 43 and discharges into the intake port 6 via a pipe 44 with a flap valve 46a. Furthermore, a cross connection pipe 45 is arranged between the pipes 10 and 44, having a flap valve 46b and an interposed auxiliary combustion chamber 47 with fuel inlet pipe 48. Under normal operating conditions, flaps 46 and 46a are open while flap 46b is closed. The engine 1 works by itself as a turbocharged engine with the exhaust passing via pipe 10c through the chamber 8 to the stack 8' without heat recovery from the exhaust. When more power is needed, pebbles are fed into the chamber 8, and the heat recovery in said chambers 8 and 19 starts operating, furnishing extra power in the turbine 21 as described with respect to FIG. 1. In this case, the turbine 21 is shown to drive an electric generator 49, but may be used for any other purpose.

In the arrangement as per FIG. 1 the turbine 21 is geared to the engine 1. When it is desired for the turbine to assist the engine, also when the latter operates in reverse direction, the turbine 21 can be equipped with a reverse wheel 21' known per se for marine steam turbines.

In supercharger arrangement as per FIG. 2 it is possible to start steam production while the engine is at standstill. For this purpose flaps 46 and 46a are closed and flap 46b opened. The turbocharger set is then rotated by the starting motor 42 (or by compressed air), fuel is fed into the combustion chamber 47 via the pipe 48 and is ignited. The turbocharger set will soon begin to operate as a power self-supporting Brayton cycle gas turbine set furnishing hot gases through the pipe 10c into the chamber 8, so that pebbles can be fed into the chambers 8, 19a and 19b, respectively, as described for FIG. 1. If the turbine 21 is mechanically coupled to engine 1 (as shown in FIG. 1), then the steam thus produced enables the steam turbine to start the engine.

Operation of the steam turbine while the engine 1 is at standstill furnishes power with comparatively good efficiency because of complete heat recovery also in this case.

While the provision of the auxiliary combustion chamber 47 with flap valves 46, 46a and 46b does not form part of this invention, the double-use of the turbocharger set for supplying hot gases for the production of superheated steam while the engine 1 is at standstill, does.

The superheated steam generator 19a and 19b may also be used for supplying steam for any purpose through a pipe 50.

It is immaterial for the purposes of this invention from what source the hot gases originate, what their composition is and in what kind of steam expansion engine the steam produced is utilized.

Having now described and illustrated my invention, I wish it to be understood that it is not limited to the special forms and arrangements of parts herein described and shown, or specifically covered by my claims, which follow.

1. In a method of producing superheated steam under superatmospheric pressure in pebble heat exchanger means that includes three chambers, which method comprises leading a continuous stream of pebbles downwardly through a first of said three chambers and in counterflow with a continuous stream of an oppositely flowing gas at substantially atmospheric pressure whereby heat is transferred from said gas stream to said pebble stream, leading the cooled gas stream to the ambient atmosphere, leading the heated pebbles into a second of said three chambers containing saturated steam of a predetermined superatmospheric pressure through which the pebbles move downwardly thereby superheating said steam in counterflow with the descending pebbles before it is led to a steam consumer, leading the partially cooled pebbles from the second chamber into a third of said three chambers connected to said second chamber and operating under the same pressure as said second chamber, said third chamber containing water which is evaporated by contact with the pebbles entering from the second chamber, the steps of:

(a) maintaining in said second chamber such uniform counterflow contact between the heated pebbles and the steam, that each pebble remains in contact with the steam for a length of time sufficient for superheating the steam by not less than ¾ of the difference between the temperature of the pebbles at their inlet to said second chamber and the saturation temperature of the steam generated in the third chamber, and (b) maintaining uniform counterflow in said third chamber between the pebbles and the water which rises upwards due to its being heated by the falling pebbles.

2. In a heat exchanger for producing superheated steam employing a continuous stream of pebbles as a heat carrier from a hot gas, the combination of:

(a) chambers comprising a first upright pebble heater chamber with inlets and outlets for the gas and pebbles respectively, for heating said pebbles descending in counterflow contact with the rising hot gas, and a second closed chamber disposed substantially below said first chamber and constituting an upper part and a lower part, said upper part containing saturated steam of elevated pressure and disposed for counterflow contact between the pebbles entering from said first chamber thereby superheating said saturated steam;

(b) baffle means disposed in the upper part of the second chamber for delaying the descent of the pebbles;

(c) said lower part of the second chamber containing water disposed below said upper part and in communication with it, arranged to receive partly cooled pebbles from the said upper part for heating and evaporating the water by contact with the pebbles;

(d) a first conduit for leading the hot gas to adjacent the bottom of said first chamber;

(e) a second conduit for leading the cooled gas from said first chamber near its top to the ambient atmosphere;

(f) first pipe means for leading the pebbles into the first chamber near its top;

(g) second pipe means for leading the pebbles from the bottom of the first chamber into the upper part of the second chamber;

(h) means for removing the cooled pebbles from the bottom of said lower part of the second chamber and leading them back into the said first chamber by said first pipe means so that the pebbles flow in a substantially closed circuit;

(i) pebble lifting means in said last named means for transporting the pebbles from the bottom of the lower part of the second chamber to the top of the first chamber;

(j) third conduit means for leading the superheated steam from near the top of said upper part of said second chamber to a steam consumer; and (k) upright partition wall means disposed within the steam generating water containing lower part of the second chamber to provide a plurality of upright channels through which the water must rise while being heated by the pebbles falling through said channels, to enforce a uniform counterflow heat exchange between the pebbles and the water.

References Cited by the Examiner

UNITED STATES PATENTS

| | | | |
|---|---|---|---|
| 1,614,387 | 1/1927 | Pereda | 165—107 |
| 2,097,883 | 11/1937 | Johansson | 60—13 X |
| 2,608,051 | 8/1952 | Nettel | 60—13 |
| 3,050,932 | 8/1962 | Mueller | 60—13 |
| 3,096,615 | 7/1963 | Zuhn | 60—13 |

FOREIGN PATENTS

| | | |
|---|---|---|
| 627,608 | 9/1961 | Canada. |
| 751,192 | 6/1956 | Great Britain. |

OTHER REFERENCES

German application No. 1,021,642, Dec. 27, 1957.

RICHARD B. WILKINSON, *Primary Examiner.*

JULIUS E. WEST, *Examiner.*